United States Patent
Nault et al.

(10) Patent No.: US 12,286,067 B2
(45) Date of Patent: Apr. 29, 2025

(54) ENERGY MANAGEMENT MODULE INCLUDING AN ENCLOSURE PROVIDING STRUCTURAL SUPPORT IN A VEHICLE

(71) Applicant: Rivian IP Holdings, LLC, Plymouth, MI (US)

(72) Inventors: Christian Nault, Los Angeles, CA (US); Jason Huang, Irvine, CA (US); Madeline Kay Dippel, San Pedro, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 318 days.

(21) Appl. No.: 17/953,733

(22) Filed: Sep. 27, 2022

(65) Prior Publication Data

US 2024/0101055 A1  Mar. 28, 2024

(51) Int. Cl.
*B60R 16/03* (2006.01)
*B60L 1/02* (2006.01)
*B62D 21/11* (2006.01)

(52) U.S. Cl.
CPC .......... *B60R 16/03* (2013.01); *B60L 1/02* (2013.01); *B62D 21/11* (2013.01)

(58) Field of Classification Search
USPC ....................................................... 180/68.5
See application file for complete search history.

(56) References Cited

U.S. PATENT DOCUMENTS

| | | | | |
|---|---|---|---|---|
| 8,186,471 | B2* | 5/2012 | Ohno | B60L 3/003 180/274 |
| 8,542,512 | B2* | 9/2013 | Garrity | H02S 40/32 361/816 |
| 8,773,150 | B2* | 7/2014 | Hironaka | B60R 21/01 324/705 |
| 10,052,942 | B2* | 8/2018 | Okuda | B60L 3/0007 |
| 10,543,872 | B2* | 1/2020 | Kirimoto | B60L 3/0007 |
| 2013/0037335 | A1* | 2/2013 | Sakamoto | B60K 1/00 180/65.8 |
| 2022/0055693 | A1* | 2/2022 | Ryuno | B62D 25/081 |
| 2022/0173641 | A1* | 6/2022 | Fujimoto | H02K 5/225 |
| 2022/0227426 | A1* | 7/2022 | Stojkovic | B62D 25/2036 |
| 2022/0247281 | A1* | 8/2022 | Nihira | H02K 11/33 |

* cited by examiner

*Primary Examiner* — Hau V Phan
(74) *Attorney, Agent, or Firm* — Patterson + Sheridan, LLP

(57) ABSTRACT

Disclosed are embodiments generally directed to an energy management module (EMM) that comprises an enclosure that provides structural support in a vehicle, such as an electric vehicle. The EMM can serve both as (1) an enclosure storing an EMM assembly and (2) a structural support member between a chassis and at least one suspension tower associated with a corresponding tire(s). The EMM is positioned between two suspension towers of the vehicle and abuts the chassis of the vehicle. The EMM includes a lid and a housing that forms the enclosure housing an EMM assembly. The EMM assembly includes a collection of electronic and/or cooling components for the vehicle. The chassis includes the base frame or structural framework of the vehicle. The suspension tower includes a frame surrounding suspension components of a tire of the vehicle.

17 Claims, 11 Drawing Sheets

ENERGY MANAGEMENT MODULE INCLUDING AN ENCLOSURE PROVIDING STRUCTURAL SUPPORT IN A VEHICLE

INTRODUCTION

The present disclosure relates generally to the automotive field. More particularly, the present disclosure relates to an energy management module which can comprise an enclosure for vehicle components while providing structural support to a vehicle.

SUMMARY

Various aspects of the technology described herein are generally directed to, among other things, an energy management module (EMM) that is a power electronics unit, having an enclosure that provides structural support in a vehicle, such as an electric vehicle. The EMM can include an enclosure storing an EMM assembly and providing structural support between a chassis and two suspension towers associated with two tires, such as the front two tires. The EMM assembly may be a collection of electronic, power, magnetic, cooling components, or a combination thereof, for the electric vehicle. The chassis refers to the base frame or structural framework of the vehicle. The suspension tower refers to the frame surrounding suspension components of a tire and may separate the suspension components and the tire from the cabin (e.g., inside) of the vehicle.

The EMM may be positioned between the suspension towers of the vehicle and abut the chassis of the vehicle. The EMM may include an enclosure comprising at least one lid and a housing that forms the enclosure housing an EMM assembly. The housing may form the lateral and/or longitudinal sides of the enclosure, a top lid may form the top side of the enclosure, and/or a bottom lid may form the bottom side of the enclosure. For example, the bottom lid may form a base that supports at least a portion of the EMM assembly. The top lid may include a first set of mounting holes (e.g., tower-mounting holes) that correspond to mounting holes on the suspension tower(s). The housing may include a second set of mounting holes (e.g., chassis-mounting holes) that correspond to mounting holes on the chassis. The first set of mounting holes may receive respective fasteners to mechanically couple the EMM to the suspension tower(s), and the second set of mounting holes may receive respective fasteners to mechanically couple the EMM to the chassis. To provide additional functionality, the top lid and the housing may include physical load transferring features.

In this manner, the disclosed embodiments provide a space-efficient system for maintaining structural support (e.g., maintaining structural functions to improve vehicle dynamics, as well as to reduce body torsion and bending) of the vehicle and for housing an EMM assembly in a designated space. By utilizing the disclosed EMM, certain components that only provide structural support, such as a cross beam (e.g., one or more braces and gussets) between the suspension towers may be omitted, thereby reducing the weight of the vehicle, improving the space-efficiency of an already restrictive area, and concentrating the EMM assembly in one area to improve the efficiency of performing maintenance of the vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE DISCLOSED SUBJECT MATTER

Figure 1:
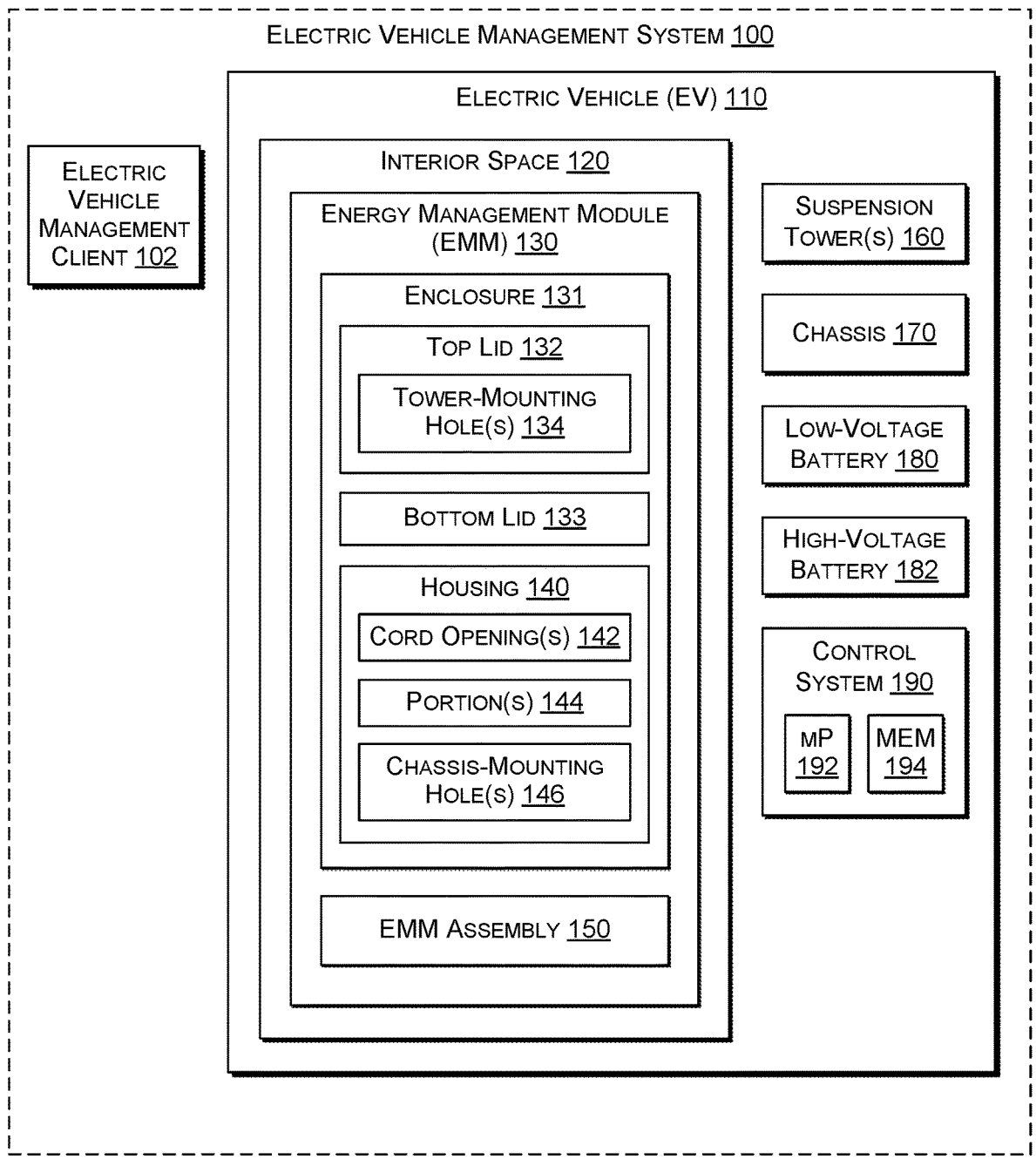
FIG. 1 is a block diagram of an exemplary schematic of an electric vehicle (EV) that includes an energy management module (EMM), in accordance with aspects of the technology described herein.

Vehicle drivers rely on vehicles to provide transportation. To provide transportation-related functionality, vehicles typically include any number of power components in various corresponding dedicated spaces, such as under the hood, under the vehicle seats, within the body of the vehicle, and so forth. For example, gas-powered vehicles may include a gasoline tank, a cooling system (e.g., a radiator), a gasoline pump, a gasoline engine, an alternator, and the like. As another example, electric vehicles may include a battery, a cooling system, an electric motor, a controller, a direct current to direct current converter, an alternating current to direct current converter, and a direct current to alternating current converter, to name a few. An increase in sophistication of vehicle components has led to increased functionality and improved performance of many vehicles.

In some vehicles, it may be advantageous to more efficiently arrange these components within a vehicle.

In the context of electric vehicles, electric components have replaced components of gas-powered vehicles. Maintaining the structural integrity of the vehicle remains a goal of many vehicle designs. For example, tires and the corresponding suspension system may absorb the impact and vibrations associated with driving on certain terrains, and the impact and vibrations may be passed to structural supports. One approach to providing the structural support between suspension towers (housing the suspension system) includes installing a cross beam between the suspension towers; however, this approach does not efficiently use space within the body of the vehicle since the space occupied by the cross beam prevents installation and placement of other vehicle components, such as electronics. Similarly, removing the cross beam to instead simply place the electronics may reduce the structural integrity of the vehicle.

Accordingly, determining optimal positions for the electrical components without compromising structural integrity of the vehicle has become a challenge, the solution for which may be difficult to achieve given the multitude of difficulties—such as those discussed above—associated with maintaining and improving upon the functional and structural features of vehicles in an already restricted space.

With this in mind, aspects of the disclosed embodiments include, among other things, an energy management module (EMM) that includes an enclosure that provides structural support (e.g., maintaining structural functions to improve vehicle dynamics and body torsion and bending) in a vehicle, such as an electric vehicle. The EMM can include an enclosure that both (1) stores an EMM assembly and (2) facilitates maintaining structural functions to improve vehicle dynamics as well as reduce body torsion and bending. In one embodiment, the EMM is positioned between a chassis and two suspension towers associated with two tires, such as the front two tires. In certain embodiments disclosed herein, the "EMM assembly" refers to a collection of electronic or power components, magnetic components, and/or cooling components of the vehicle (e.g., electric vehicle). Example components include cooling fluid, a fluid flow path, a controller, a direct current to direct current converter, an alternating current to direct current converter, and a direct current to alternating current converter, a printed circuit board (PCB), a connector, and/or a relay, to name a few. Although certain embodiments of the EMM assembly are discussed in the context of having certain electronic or power components, magnetic components, and/or cooling components, it should be understood that the EMM is not limited to such components, since in some embodiments the EMM may include any additional or alternative suitable vehicle components. For example, in one embodiment, the EMM includes a collection of electronic or power components and magnetic components, but omits cooling components.

In certain embodiments disclosed herein, the "chassis" refers to the base frame or body framework of the vehicle. In certain embodiments disclosed herein, the "suspension tower" refers to the frame surrounding suspension components of a tire and may separate the suspension components and the tire from the inside of the vehicle. An example suspension tower is illustrated in at least FIGS. 2 and 3. The EMM may be positioned between the suspension towers of the vehicle and may abut the chassis of the vehicle. In certain embodiments, the EMM includes an enclosure that includes a top lid, a bottom lid, and a housing that forms the enclosure housing an EMM assembly. In these embodiments, the housing forms the lateral and longitudinal sides of the enclosure, and the top lid forms the top side of the enclosure. The enclosure of the EMM may include a bottom lid that supports at least a portion of the EMM assembly.

The top lid may include tower-mounting holes (e.g., a first set of mounting holes) that correspond to mounting holes on the suspension tower(s). The housing may include chassis-mounting holes (e.g., a second set of mounting holes) that correspond to mounting holes on the chassis. The tower-mounting holes may receive respective fasteners (e.g., bolts, screws, or pins) to mechanically couple the EMM to the suspension tower(s), and the chassis-mounting holes may receive respective fasteners (e.g., bolts, screws, or pins) to mechanically couple the EMM to the chassis. However, it should be understood that in some implementations the tower-mounting holes may instead correspond to tower-coupling mounting points that couple the EMM to the suspension towers via any suitable mechanism (with or without holes or fasteners), and the chassis-mounting holes may instead correspond to chassis-coupling mounting points that couple the EMM to the chassis via any suitable mechanism (with or without holes or fasteners).

To provide additional functionality, the top lid and the housing may include load transferring features. Regarding the top lid, first, the top lid may include truss members. The truss members may be collinear arranged between the suspension towers. The truss members may be positioned on the top surface of the top lid. Second, the top lid may include load transferring ridges to facilitate load transfer (e.g., between the left-right suspension systems) associated with driving on certain terrain. Third, the top lid may include a tower-coupling member that facilitates load transfer from the suspension towers to the top lid. The size of the tower-coupling member may be optimized to simultaneously reduce the size of the tower-coupling member and increase the size of the inside of the EMM.

Regarding the housing, first, the front side of the housing may include housing protrusions on the points of contact between the housing and the chassis. The housing protrusions may facilitate load transfer from the chassis to the housing. The chassis-mounting holes may be positioned on the housing protrusions. Second, the housing may include connector mounting holes that receive cords or connectors that couple components of the EMM assembly to components external to the EMM.

In this manner, aspects of the disclosed embodiments provide a space-efficient system for maintaining structural functions to improve vehicle motion (e.g., dynamics), as well as to reduce body torsion and bending of the vehicle; and for housing an EMM assembly in a dedicated space. By utilizing the disclosed EMM, certain components that only provide structural support, such as a cross beam between the suspension towers may be omitted, thereby reducing the weight of the vehicle, improving the space-efficiency of an already restrictive area, and concentrating the EMM assembly in one area to improve the efficiency of performing maintenance of the vehicle. For example, by concentrating the electronic assembly in one area, service personnel may more easily locate a component for maintenance or replacement purposes.

Aspects of the technical solution can be described by way of examples and with reference to FIGS. 1-11. FIG. 1 illustrates an EV management system 100 that includes an electric vehicle management client 102 and an electric vehicle (EV) 110. As used herein, "electric vehicle management client" 102 may refer to a personnel or user who engages with the EV 110 and/or the corresponding components. By way of non-limiting examples, the electric vehicle management client 102 may include a driver of the EV 110, a passenger of the EV 110, a station manager of a charging station, a service personnel, maintenance personnel, and any other person that may interact with the EV 110. Moreover, although certain embodiments discussed herein are discussed in the context of an EV 110, it should be understood that aspects of the embodiments disclosed herein apply to a hybrid vehicle, a vehicle powered by fuel, or any other vessel capable of transporting passengers and/or cargo.

The EV 110 may include an interior space 120 that includes an energy management module (EMM) 130. As discussed above, the EMM 130 comprises an enclosure 131 that provides structural support within the interior space 120. The enclosure 131 of the EMM 130 may include a top lid 132 and a bottom lid 132. The top lid 132 may have tower-mounting holes 134. In one embodiment, the bottom lid 133 forms a base for the enclosure 131 of the EMM 130 and support one or more components of the EMM assembly. In one embodiment, the top lid 132 forms the top side of the enclosure 131 formed by the EMM 130. The enclosure 131 of the EMM 130 may also include a housing 140 having cord openings 142, a portion 144, and chassis-mounting holes 146. In one embodiment, the housing 140 forms the lateral and longitudinal sides of the enclosure 131 formed by the EMM 130. The enclosure 131 of the EMM 130 may include a bottom lid 133 supporting components of the EMM 130. In this manner, the top lid 132, the bottom lid 133, and the housing 140 may form the enclosure 131 of the EMM 130.

The EMM 130 can include an enclosure 131 that both (1) stores an EMM assembly 150 and (2) provides structural support between two suspension towers 160 and that abuts a chassis 170. In one embodiment, the EMM assembly 150 is a collection of electronic, power, magnetic, and/or cooling components housed within the top lid 132, the bottom lid 133, and the housing 140 of EMM 130. Example components of the EMM assembly 150 include cooling fluid, a fluid flow path, a controller, a direct current to direct current converter, an alternating current to direct current converter, and a direct current to alternating current converter, a printed circuit board (PCB), a connector, and/or a relay, to name a few.

In one example, the suspension tower 160 refers to the frame surrounding suspension components of a tire and may separate the suspension components and the tire from the interior space 120 of the EV 110. In one example, the chassis 170 refers to the base frame or outer structural framework of the EV 110. In one example, the interior space 120 is defined as the volume between the suspension towers 160 (e.g., of the two front tires), the chassis 170, the front dashboard 202 (FIG. 2) of the EV, and/or the front body of the EV 110. For example, the interior space 120 is positioned within the body of the vehicle, in front of a cabin of the vehicle, above the chassis, and medially-inward relative to the two front suspension towers 160. In one embodiment, the interior space 120 is large enough to accommodate the EMM 130 and corresponding EMM assembly 150.

In one embodiment, the EMM 130 mechanically couples to the suspension tower 160 via the top lid 132. For example, the tower-mounting holes 134 of the top lid 132 correspond to mounting holes on the suspension tower(s) 160. The tower-mounting holes 134 and corresponding mounting holes on the suspension tower(s) 160 may align and receive a fastener to couple the top lid 132 and the suspension tower 160. However, it should be understood that in some implementations the tower-mounting holes 134 may instead correspond to tower-coupling mounting points that couple the EMM 130 to the suspension towers 160 via any suitable mechanism (with or without holes or fasteners).

In one embodiment, the EMM 130 mechanically couples to the chassis 170 via the housing 140. For example, the chassis-mounting holes 146 correspond to mounting holes on the chassis 170. The chassis-mounting holes 146 may receive respective fasteners (e.g., bolts, screws, or pins) to mechanically couple the housing 140 and the chassis 170. However, it should be understood that in some implementations the chassis-mounting holes 146 may instead correspond to chassis-coupling mounting points that couple the EMM 130 to the chassis 170 via any suitable mechanism (with or without holes or fasteners).

The housing 140 may include dividers to divide the inside of the enclosure 131 of the EMM 130 formed by the top lid 132, the bottom lid 133, and the housing 140. In one embodiment, the dividers form portions 144 inside of the enclosure 131 of the EMM 130. In one example, the portions 144 correspond to chambers or segmented areas within the enclosure 131 of the EMM 130. For example, the divider partitions the enclosure 131 formed by the top lid 132, the bottom lid 133, and the housing 140 into a top portion and a bottom portion, into a left portion and a right portion, or any other arrangement of portions 144. The portions 144 may serve as dedicated spaces for certain components of the EMM assembly 150. For example, a first portion houses a first subset of the components of the EMM assembly 150, a second portion houses a second subset of the components of the EMM assembly 150, and/or so forth.

The components of the EMM assembly 150 may be wired and connected to a low-voltage battery 180 and/or a high-voltage battery 182. In one embodiment, the top lid 132, the bottom lid 133, and/or the housing 140 include openings sized to allow any suitable cord or connector to connect the EMM assembly 150 to any component external to the enclosure 131 of the EMM 130, such as the low-voltage battery 180 and/or the high-voltage battery 182. For example, a cord connects a converter (e.g., a direct current to alternating current converter) of the EMM assembly 150 to the low-voltage battery 180 and/or the high-voltage battery 182.

The low-voltage battery 180 may correspond to a power source that provides power to vehicle components, such as the windshield wipers, the radio, and/or other on-board devices, even when the vehicle is powered off. In one embodiment, the low-voltage battery 180 is a 12-volt (v) battery. The high-voltage battery 182 may correspond to a rechargeable battery used to power an electric motor of the EV 110. In one embodiment, the high-voltage battery 182 includes any suitable battery pack module, such as battery packs including lithium-iron phosphate (LFP) battery cells, high-nickel battery cells, lithium-ion battery cells, sodium nickel chloride (e.g., "Zebra") battery cells using molten sodium chloroaluminate, and the like. The high-voltage battery may include a deep-cycle battery or any suitable battery having a power-to-weight ratio, a specific energy, and an energy density that is higher than a starting, lighting, and ignition (SLI) battery.

The EV 110 may include a control system 190 that includes a processor 192 and a memory device 194. The control system 190 may be integral to the EMM assembly 150 or separate and external to the EMM assembly 150 and/or the EMM 130. Alternatively, certain components of the control system may be integral or within the EMM assembly 150, while other components are separate from or external to the EMM assembly 150. A detailed discussion of the processor 192 may be found below with respect to the processor 1114 of FIG. 11, and a detailed discussion of the memory device 194 may be found below with respect to the memory 1112 of FIG. 11. In one embodiment, the control system 190 includes computer logic to control operations of the components of the EMM assembly 150 or other components of the EV 110, such as those depicted in FIG. 11. It should be understood that the control system 190 may include any additional or alternative control logic to facilitate efficient operations of the EV management system 100.

Figure 2:
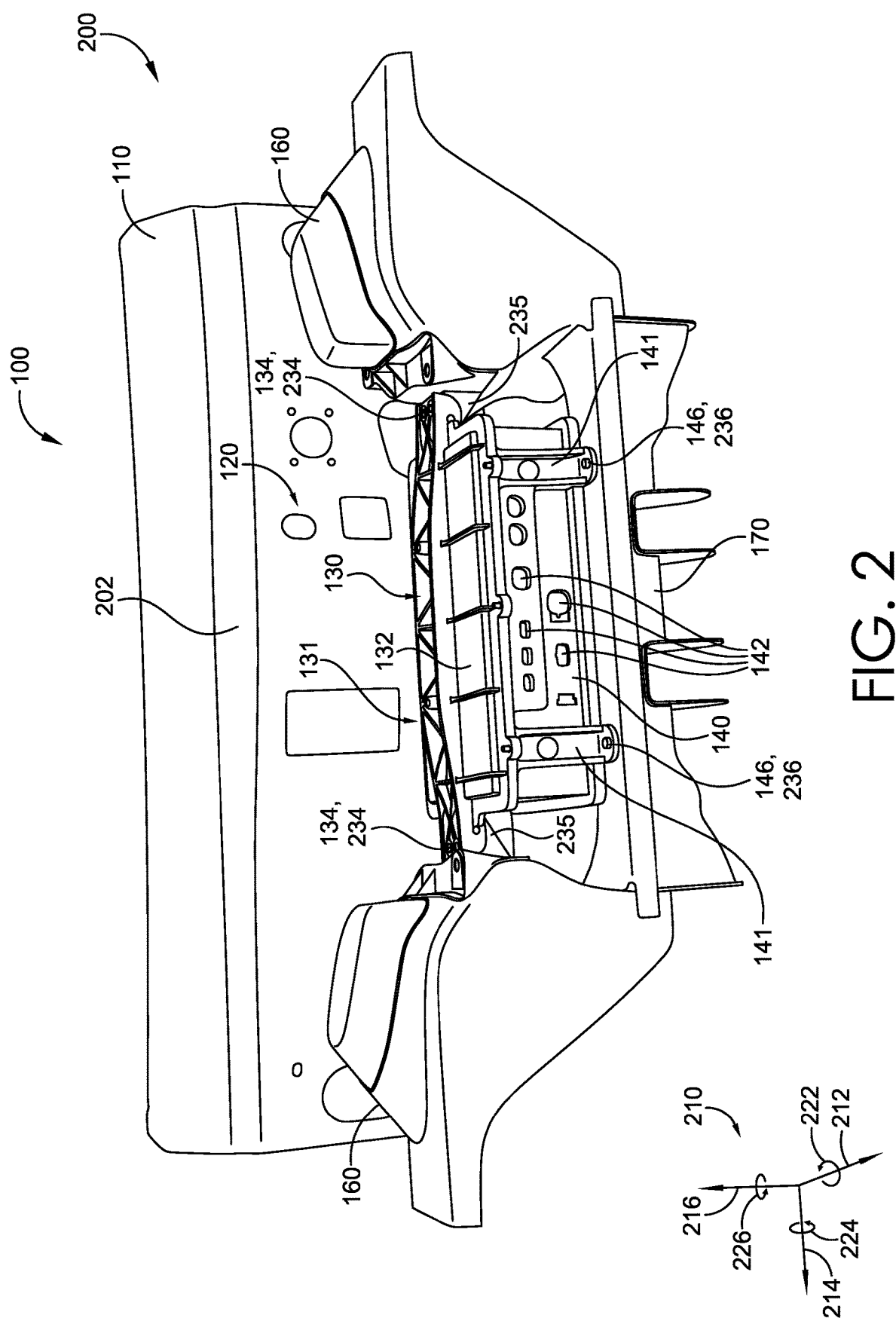
FIG. 2 is a schematic diagram of an isometric view of an example EV having an EMM coupled to a suspension tower and a chassis of the EV, in accordance with aspects of the technology described herein.

Turning to FIG. 2, depicted is a schematic diagram 200 of an isometric view of an example EV 110 having an EMM 130 coupled to a suspension tower 160 and a chassis 170 of the EV 110. As discussed above, the EMM 130 may be positioned within an interior space 120 of the EV 110. In one embodiment, the interior space 120 is defined between two suspension towers 160, the chassis 170, a front dashboard 202, and a hood (not pictured) of the EV. In one example, the front dashboard 202 is a surface separating the cabin of the EV from the components depicted in the schematic diagram 200. For example, the front dashboard 202 separates the electric vehicle management client 102 (FIG. 1) from the internal components of the EV 110 when the electric vehicle management client 102 is seated inside the cabin of the EV 110 or operating the EV 110.

To facilitate discussion, a coordinate system 210 having three orthogonal axes is reproduced. As illustrated, the example coordinate system 210 includes a longitudinal axis 212, a lateral axis 214, and a vertical axis 216. The longitudinal axis 212 may be oriented along a direction of travel of the EV 110. The lateral axis 214 may be oriented perpendicular to the direction of travel of the EV 110 and parallel to a ground on which the EV 110 travels. The vertical axis 216 may be oriented along the same direction as the gravity vector. Additionally, in the context of rotational motion, the coordinate system 210 defines a roll direction 222 as rotation about the longitudinal axis 212, a pitch direction 224 as rotation about the lateral axis 214, and yaw direction 226 as rotation about the vertical axis 216. With this coordinate system 210 in mind, the interior space 120 may be defined along the longitudinal axis 212 between the front dashboard 202 and the front fender of the EV, along the lateral axis 214 as between the two illustrated suspension towers 160, and along the vertical axis 216 as between the chassis 170 and the hood of the EV 110.

As discussed above, the enclosure 131 of the EMM 130 may include the top lid 132 coupled to the suspension tower 160. In one embodiment, the top lid 132 includes tower-mounting holes 134 that correspond to tower holes 234 on the suspension towers 160. For example, during assembly, the top lid 132 is positioned on top of the housing 140, such that the tower-mounting holes 134 align with the tower holes 234 on the suspension towers 160. Continuing this example, a fastener (e.g., bolt, screw, or pin) may then be inserted into the aligned tower-mounting holes 134 and tower holes 234. In this manner, the fasteners can rigidly fix the top lid 132 to the suspension tower 160, for example, at the aligned tower-mounting holes 134 and tower holes 234. The tower holes 234 may be positioned on a lip 235 of the suspension tower 160. The lip 235 may abut the top lid 132 and the housing 140.

As discussed above, the enclosure 131 of the EMM 130 may include the housing 140 coupled to the chassis 170. In one embodiment, the front side of the housing 140 may include housing protrusions 141 on the points of contact between the housing and the chassis. The housing protrusions 141 may bear and transfer loads from the chassis 170 to the housing 140. The housing protrusions 141 may be integral to the housing 140. In one embodiment, the housing 140 includes chassis-mounting holes 146 that correspond to chassis holes 236 on the chassis 170. The chassis-mounting holes 146 may be positioned on the housing protrusions 141. For example, during assembly, the housing 140 is positioned between the suspension towers 160 with at least a portion of the housing 140 abutting the chassis 170, such that the chassis-mounting holes 146 align with the chassis holes 236 on the chassis 170. Continuing this example, thereafter, a fastener (e.g., bolt, screw, or pin) may be inserted into the aligned chassis-mounting holes 146 and chassis holes 236. In this manner, the fasteners can rigidly fix the housing 140 to the chassis 170, for example, at the aligned chassis-mounting holes 146 and chassis holes 236.

In one embodiment, the EMM 130 has six points of contact with the suspension tower 160 and the chassis 170. In one embodiment, the at least one tower-mounting hole 134 is positioned at a higher elevation than at least one chassis-mounting hole 146. As illustrated, the top lid 132 has two points of contact (via tower-mounting holes 134) with a first suspension tower 160 and two points of contact (via tower-mounting holes 134) with a second suspension tower 160, and the housing 140 has two points of contact (via chassis-mounting holes 146) with the chassis 170. However, it should be understood that any additional or less points of contact may exist between the EMM 130 and the suspension tower(s) 160 and chassis 170. Although this embodiment is discussed in the context of using fasteners (e.g., bolts, screws, or pins) to mechanically couple the EMM 130 to the suspension towers 160 and the chassis 170, it should be understood that any suitable connecting technique may be employed.

In some embodiments, the housing 140 includes cord openings 142. As used herein, in one example, "cord" broadly refers to any conduit, circuitry line, connector, fluid line, string, wire, fiber cable, or connection line that connects the components of the EMM assembly 150 to components external to the EMM 130. Example cords include electrical wiring connecting (1) the alternating current to direct current converter of the EMM assembly 150 to (2) a battery (e.g., high-voltage battery 182) of the EV 110. The cord openings 142 may include holes of various shapes and sizes to receive cords of corresponding different shapes and sizes. The cords traversing through the cord openings 142 may couple the components (e.g., the EMM assembly 150) of the EMM 130 or within the enclosure 131 of the EMM 130 formed by the housing 140 and top lid 132 to components external to the enclosure 131 of the EMM 130. In one embodiment, at least one cord opening 142 may receive more than one corresponding cord.

Figure 3:
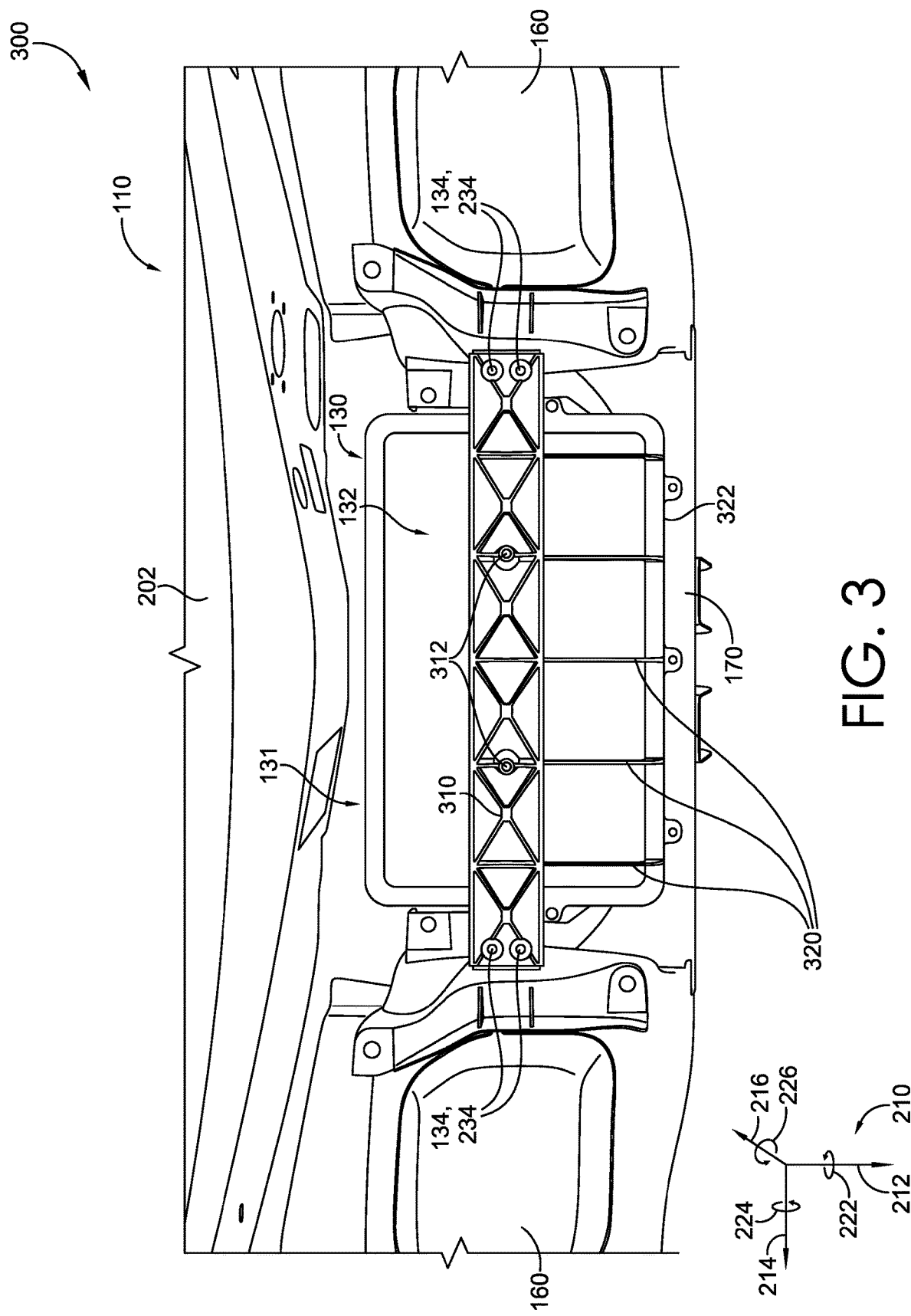
FIG. 3 is a schematic diagram of a top side view of an example EV having an EMM coupled to a suspension tower and a chassis of the EV, in accordance with aspects of the technology described herein.

Turning to FIG. 3 and with reference to the coordinate system 210 of FIG. 2, depicted is a schematic diagram 300 of a top side view of an example EV 110 having an EMM 130 coupled to a suspension tower 160 and a chassis 170 of the EV, in accordance with aspects of the technology described herein. In one embodiment, the top lid 132 includes a plurality of truss members 310. The truss members 310 extend outward from the top lid 132, for example, along the vertical axis 216. In one embodiment, the truss members 310 may be collinearly arranged between (1) the tower-mounting holes 134 that correspond to tower holes 234 of a first suspension tower 160 and (2) the tower-mounting holes 134 that correspond to tower holes 234 of a second suspension tower 160. For example, the truss members 310 may be arranged in the illustrated "x" configuration between the two suspension towers 160. In this manner, the truss members 310 may better provide stability to the EMM 130 by supporting or reducing movement or forces (e.g., loads along the lateral axis 214), such as compressive forces associated with the EV 110 driving on uneven surfaces.

The top lid 132 may include mounting members 312. In one embodiment, the mounting members 312 may be positioned between respective truss members 310, as illustrated. The mounting members 312 may include a conical emboss extending outward from the top lid 132 with a hole at the top portion of the mounting member 312. In one embodiment, the hole at the top of the mounting member 312 may receive an auxiliary electrical component (e.g., thermal components). The auxiliary electrical component may correspond to any electrical device that may mate with the mounting member 312 to be positioned on top of the top lid 132. For example, the mounting member 312 may support an auxiliary electrical component that may be fixed to the top lid 132 by way of the hole of the mounting member 312. Alternatively or additionally, the mounting member 312 may receive a cord via the hole of the mounting member to connect a component of the EMM assembly 150 (FIG. 1) with a component external to the EMM 130.

The top lid 132 may include load transferring ridges 320. The load transferring ridges 320 may be arranged in such manner as to resist compressive, torsion, and bending forces while maintaining a lowest possible weight. By way of non-limiting examples, in one embodiment, the load transferring ridges 320 are perpendicular to the arrangement of the truss members 310. In one embodiment, the load transferring ridges 320 are positioned on the front half of the top lid 132. For example, the load transferring ridges 320 may extend between a front edge 322 of the top lid 132 and the truss members 310. As illustrated, the load transferring ridges 320 may extend along the longitudinal axis 212, and the truss members 310 are arranged along the lateral axis 214. In this manner, the load transferring ridges 320 may transfer loads from the front of the EV 110 to the back of the EV 110. In particular, loads associated with accelerating and decelerating along uneven terrain may be transferred from the chassis 170 (to the housing 140 (FIG. 2) and then) to the truss members 310 along the load transferring ridges 320. Although certain positions and arrangements of the load transferring ridges 320 are provided herein, it should be understood that the load transferring ridges 320 may be arranged in any suitable alternative or additional configuration(s), such as other positions, other arrangements, or may even be omitted from the top lid 132.

It should be understood that in some embodiments, the load transferring ridges 320 may extend along the entire length of the top lid 132, instead of only a portion of the length of top lid 132. Additionally, in some embodiments, the position of the load transferring ridges 320 and truss members 310 are switched relative to the illustrated embodiment, such that the load transferring ridges 320 are oriented along the lateral axis 214, while the truss members 310 are arranged along the longitudinal axis 212. Moreover, more or less quantity of truss members 310, mounting members 312, and/or load transferring ridges 320 may be used in any suitable arrangement.

Figure 4:
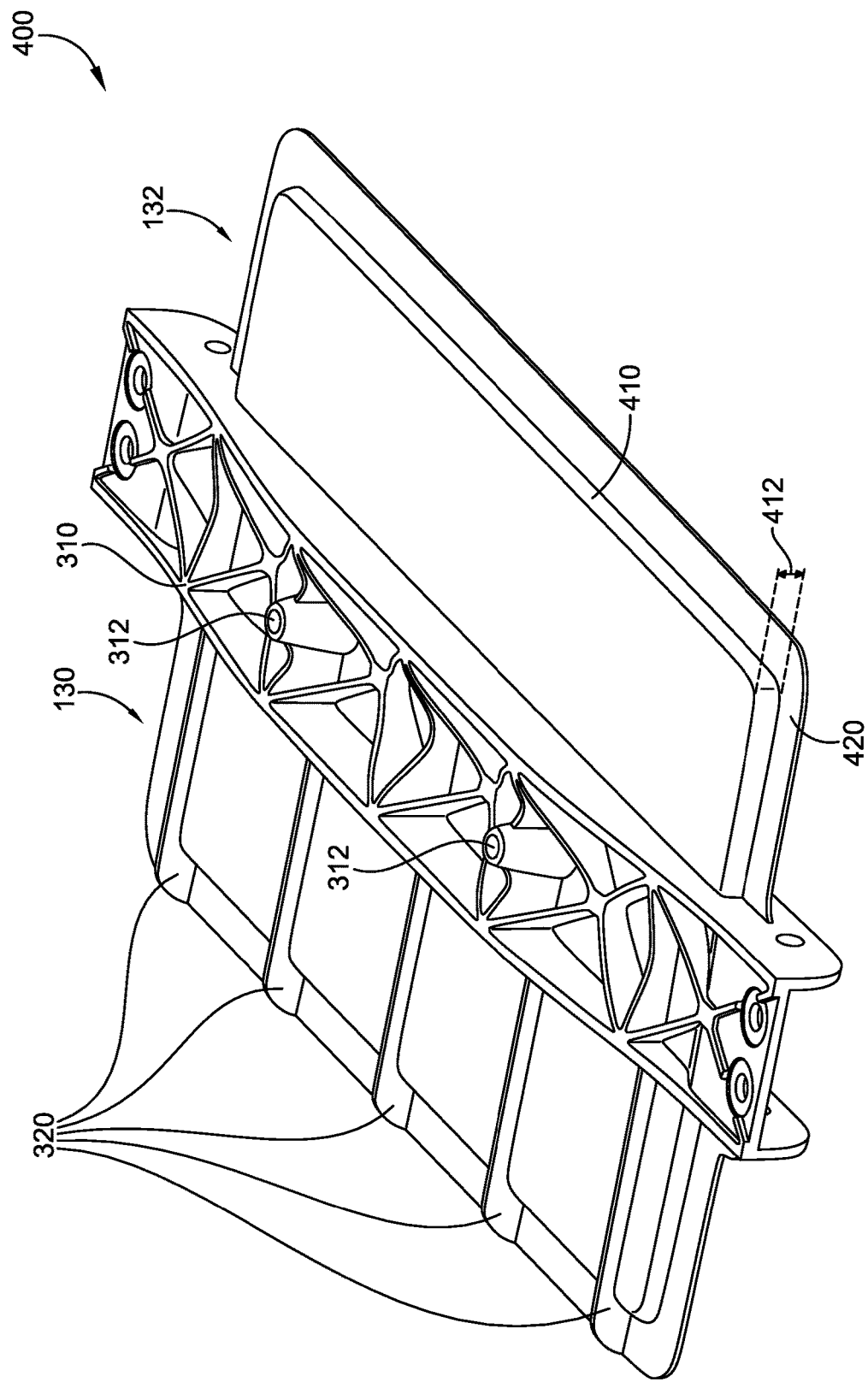
FIG. 4 is a schematic diagram of an isometric top view of an example top lid of an EMM, in accordance with aspects of the technology described herein.

FIG. 4 is a schematic diagram 400 of an isometric top view of an example top lid 132 of an enclosure 131 of the EMM 130, in accordance with aspects of the technology described herein. In the illustrated example, the top lid 132 includes truss members 310, mounting members 312 and load transferring ridges 320. In one embodiment, the top lid 132 includes an elevated portion 410 having a height 412 relative to the surrounding portion 420 of the top lid. For example, the elevated portion 410 has a height 412 that is greater than that of the surrounding portion 420. In this manner, the top lid 132 may create more volume inside the enclosure 131 of the EMM 130 formed by the housing 140 and the top lid 132 since the height 412 may accommodate larger or additional components of the EMM assembly 150.

Figure 5:
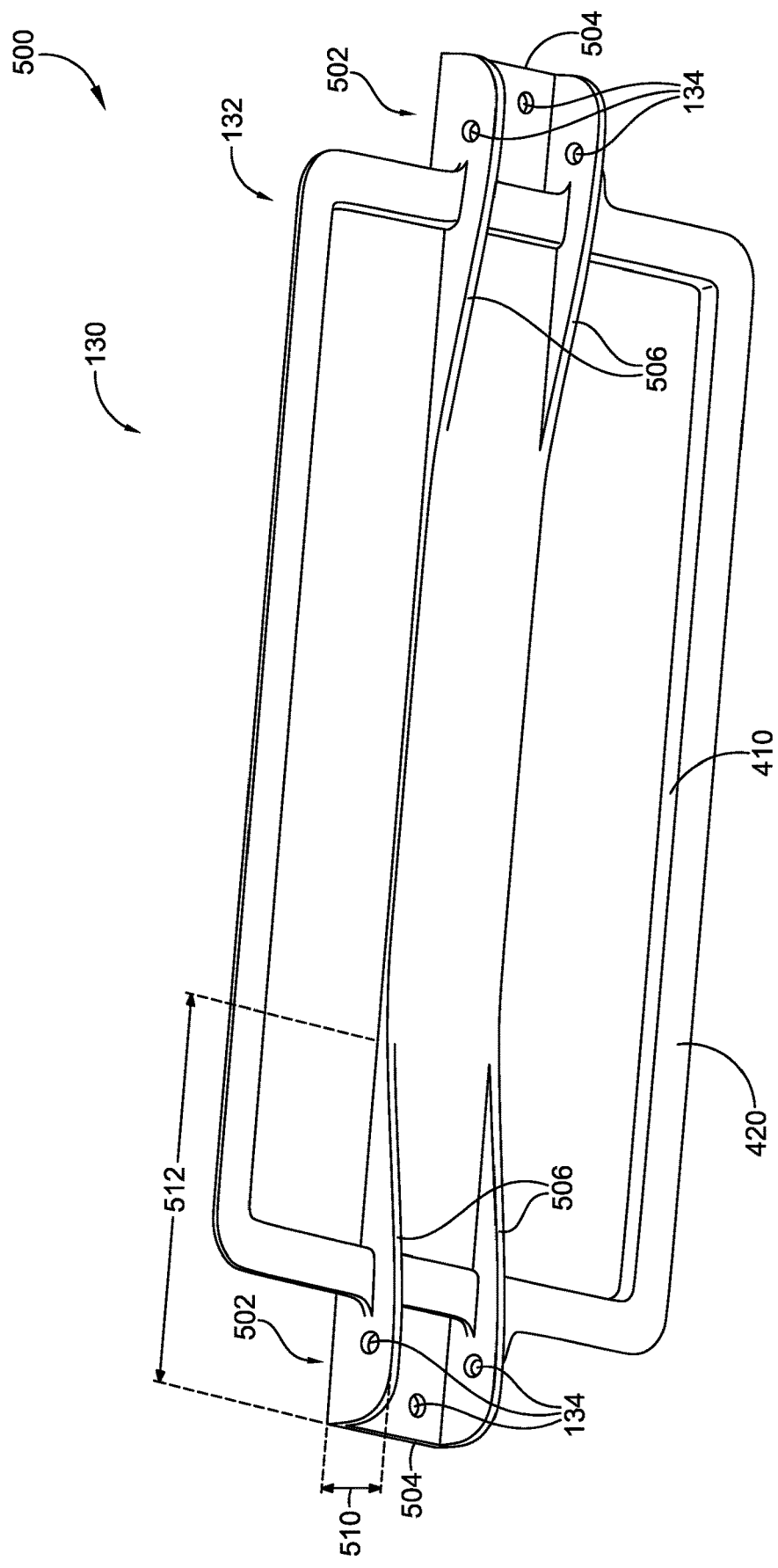
FIG. 5 is a schematic diagram of an isometric bottom view of an example top lid of an EMM, in accordance with aspects of the technology described herein.

Turning to FIG. 5, depicted is a schematic diagram 500 of an isometric bottom view of an example top lid 132 of an enclosure 131 of an EMM 130, in accordance with aspects of the technology described herein. As illustrated, the top lid 132 may include the elevated portion 410 having a height 412 (FIG. 4) that is greater than that of the surrounding portion 420. In this example, the top lid 132 includes a tower-coupling member 502 that includes the tower-mounting holes 134. As illustrated, the tower-coupling member 502 may be U-shaped with one or more tower-mounting holes 134 on each planar surface of the tower-coupling member 502. For example and as illustrated, the tower-coupling member 502 includes four tower-mounting holes 134, namely, two tower-mounting holes 134 on a top portion 504 of the tower-coupling member 502 and one tower-mounting hole on each side portion 506. In one embodiment, the tower-mounting holes 134 are positioned at a higher elevation than the chassis-mounting holes 146 (FIG. 2).

In one embodiment, the side portions 506 of the tower-coupling member 502 have a height 510 and length 512. The height 510 of the side portions 506 may be larger at the distal portion (e.g., the side farthest away from the center of the top lid 132) than the proximal portion of the top lid 132. For example, the height 510 decreases as the height 510 approaches the center of the top lid 132 along length 512. In one embodiment, the side portion 506 may be substantially triangular or substantially trapezoidal. The ratio of the height 510, and length 512 may be optimized relative to the height and length of the EMM 130 to minimize the size of the tower-coupling member 502, while maximizing the space inside the EMM 130 and maximizing the load transferring capabilities of the truss members 310 (FIG. 3) and the tower-coupling members. It should be understood that the tower-coupling member 502 may be of any suitable shape (other than the illustrated U-shape) having planar or non-planar surfaces and may include any number of tower-mounting holes 134.

Figure 6:
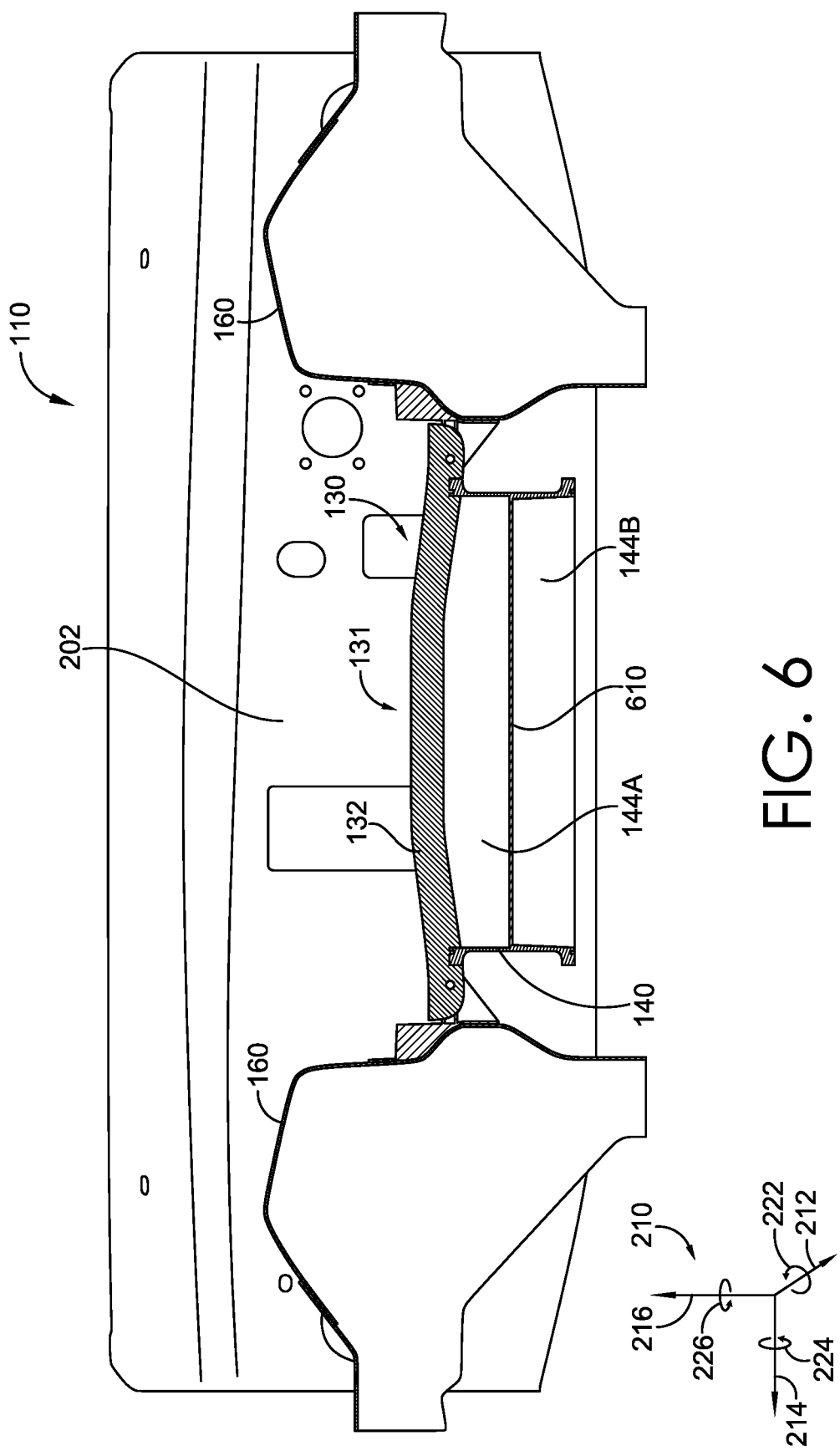
FIG. 6 is a schematic diagram of a front cross section view of an example EV having an EMM coupled to a suspension tower and a chassis of the EV, in accordance with aspects of the technology described herein.

FIG. 6 is a schematic diagram 600 of a front cross section view of an example EV 110 having an EMM 130 coupled to a suspension tower 160 and a chassis 170 (FIG. 1) of the EV 110, in accordance with aspects of the technology described herein. In one embodiment, the top lid 132 is U-shaped as illustrated. In this example, the cross-sectional area along the longitudinal axis 212 of the top lid 132 is U-shaped to provide additional clearance for the components of the EMM assembly 150 arranged within the EMM 130. However, it should be understood that the cross-sectional area along the longitudinal axis 212 of the top lid 132 may be of any suitable shape.

In one embodiment, the housing 140 includes a divider 610 to divide the inside of the enclosure 131 (of the EMM 130 formed by the top lid 132 and the housing 140) into portions 144. In this example, the divider 610 divides the inside of the enclosure 131 of the EMM 130 into a top portion 144A and a bottom portion 144B. The portions 144 may serve as dedicated spaces for certain components of the EMM assembly 150 (FIG. 1). For example, a first portion houses a first subset of the components of the EMM assembly 150, a second portion houses a second subset of the components of the EMM assembly 150, and/or so forth. In one embodiment, the divider 610 includes openings to allow components or cords to be shared between the portions 144. Although the illustrated example includes one divider 610 forming two portions 144 separated along the vertical axis 216, it should be understood that the housing 140 may include any number of dividers 610 forming any number of portions 144 within the enclosure 131 of the EMM 130.

Figure 7:
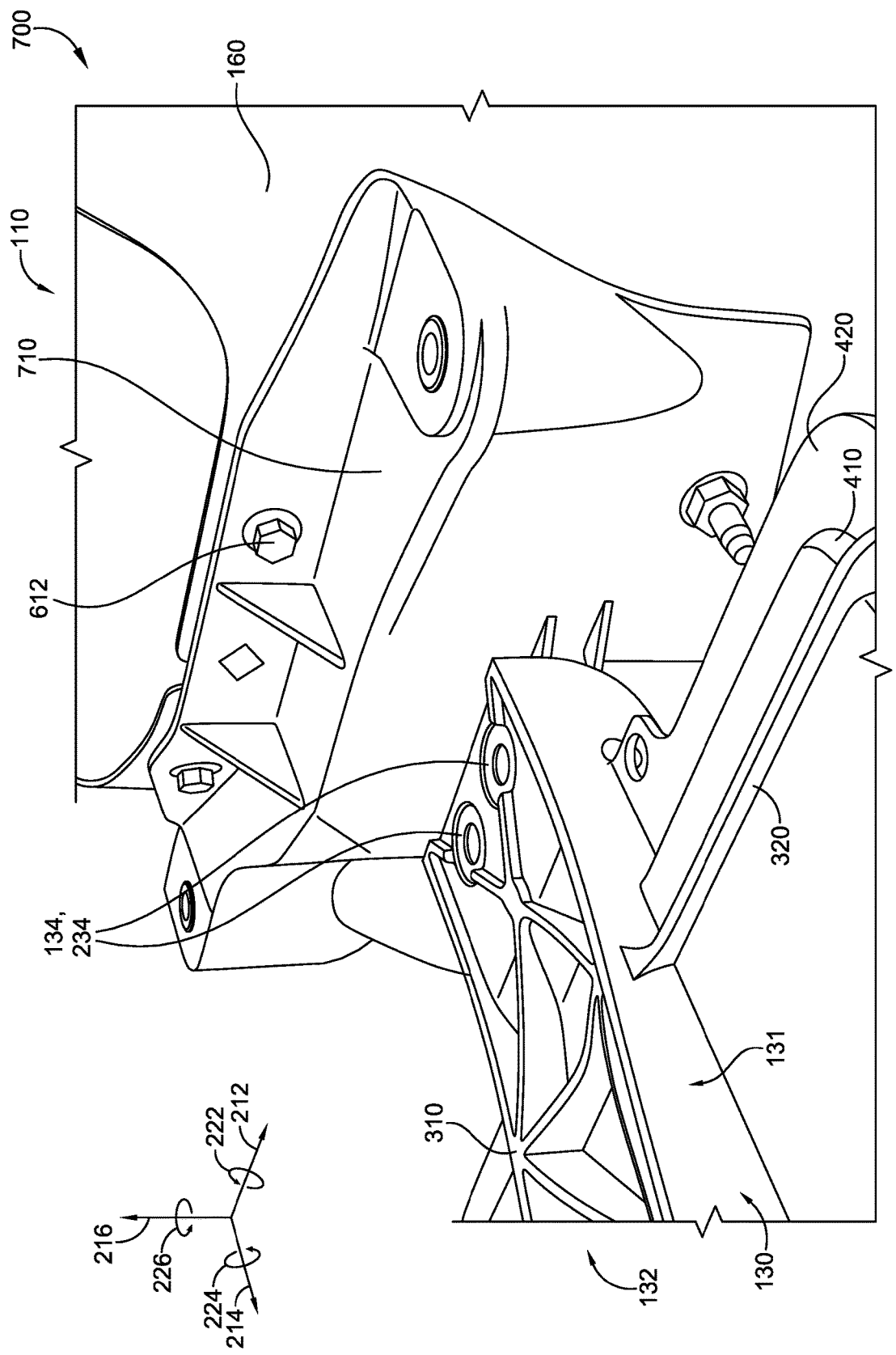
FIG. 7 is a schematic diagram of top isometric view of an example top lid of an EMM coupled to a suspension tower of an EV, in accordance with aspects of the technology described herein.

FIG. 7 is a schematic diagram 700 of top isometric view of an example top lid 132 of an enclosure 131 of the EMM 130 coupled to a suspension tower 160 of an EV 110, in accordance with aspects of the technology described herein. In one embodiment, the top lid 132 couples to the suspension tower 160 via a suspension tower adaptor bracket 710. The suspension tower adaptor bracket 710 may include the tower holes 234. In one embodiment, the suspension tower adaptor bracket 710 couples to the suspension tower 160 via holes that correspond to holes on the suspension tower 160 and that receive corresponding tower-coupling fasteners 612. It should be understood that in some embodiments, the suspension tower adaptor bracket 710 may be omitted, such that the top lid 132 couples directly to the suspension tower 160.

Figure 8:
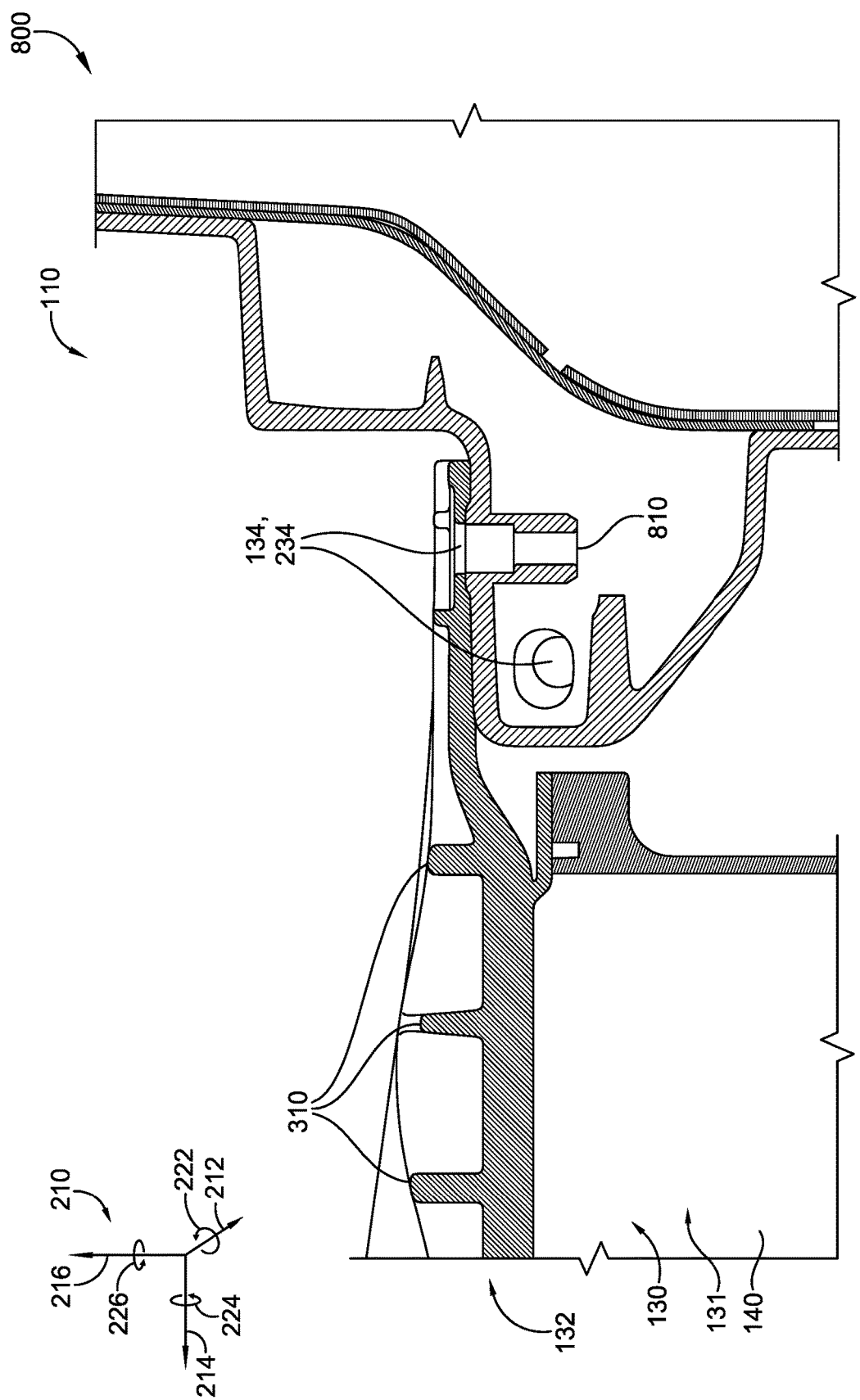
FIG. 8 is a schematic diagram of a front cross section view of an example top lid of an EMM coupled to a suspension tower of an EV, in accordance with aspects of the technology described herein.

FIG. 8 is a schematic diagram 800 of a front cross section view of an example top lid 132 (and the housing 140) of an enclosure 131 of an EMM 130 coupled to a suspension tower 160 of an EV 110, in accordance with aspects of the technology described herein. As illustrated, the truss members 310 may be integrated into the top lid 132. In one embodiment, a fastener 810 is inserted into the aligned tower-mounting holes 134 and tower holes 234. Although only one pair of the aligned tower-mounting holes 134 and tower holes 234 include the fastener 810, it should be understood that other pairs of the aligned tower-mounting holes 134 and tower holes 234, such as the tower-mounting holes 134 and tower holes 234 aligned along the longitudinal axis 212, may receive a corresponding fastener 810.

Figure 9:
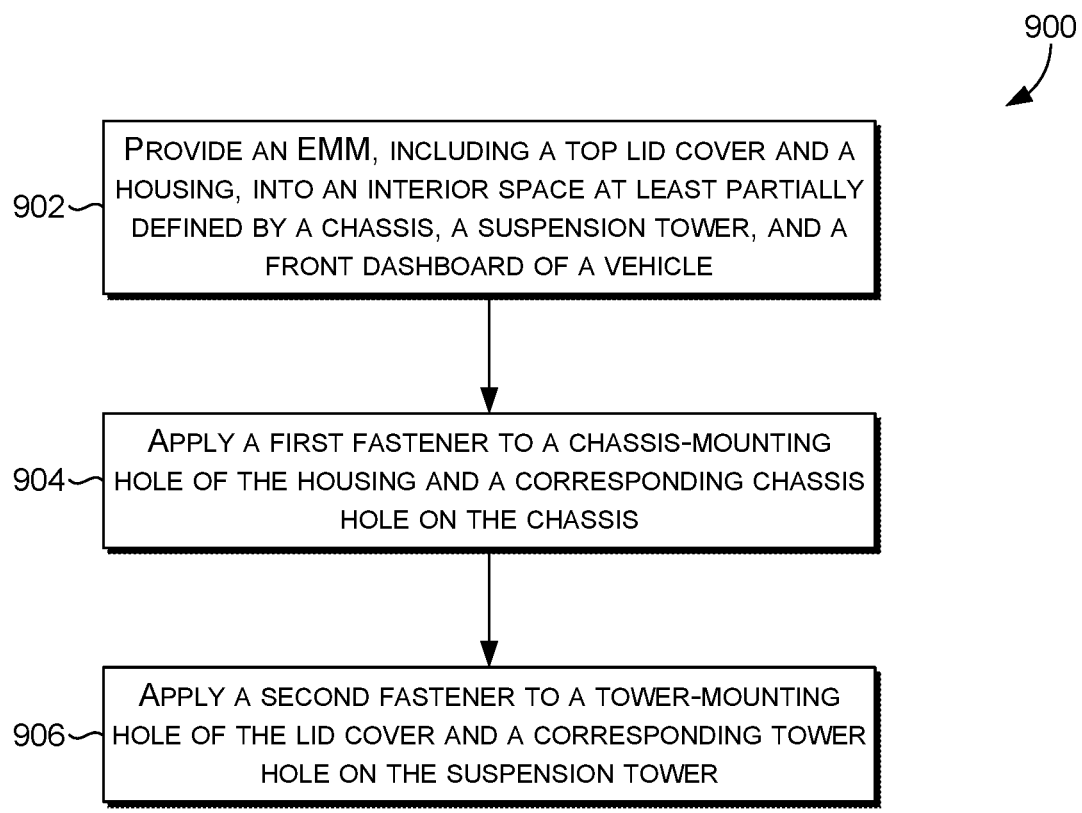
FIG. 9 is a flow diagram of an example method for assembling an EMM, in accordance with aspects of the technology described herein.

FIG. 9 is a flow diagram of an example process 900 (e.g., method) for assembling the EMM 130 (FIG. 1), in accordance with aspects of the technology described herein. It should be understood that process 900 may be performed by any suitable device or person. Process 900 includes providing (block 902) an EMM 130 (FIG. 1) including a top lid 132 (FIG. 1) and a housing 140 (FIG. 1) into an interior space 120 (FIG. 1). In one embodiment, the interior space 120 is at least partially defined by a chassis 170 (FIG. 1), a suspension tower 160 (FIG. 1), and a front dashboard 202 (FIG. 2) of the EV 110. In one embodiment, the EMM 130 includes an enclosure 131 (FIG. 1) formed by the top lid 132, the housing 140, and the bottom lid 133. In one embodiment, the top lid 132, the housing 140, and/or the bottom lid 133 are individually provided into the interior space 120 and arranged to form the EMM 130.

Example process 900 includes applying (block 904) a first fastener (e.g., fastener 810 of FIG. 8) to a chassis-mounting hole 146 and a corresponding chassis hole 236 (FIG. 2) on the chassis 170. Example process 900 includes applying (block 906) a second fastener (e.g., fastener 810) into a tower-mounting hole 134 (FIG. 1) of the top lid 132 and a corresponding tower hole 234 (FIG. 2) on the suspension tower 160. The process 900 may include any additional or alternative steps, in addition to or in lieu of those illustrated in process 900. For example, process 900 may include coupling the EMM 130 and its respective components to the vehicle at any suitable position (within or other than within the interior space 120) via any suitable fixing mechanism.

Additional Support for Detailed Description of the Disclosed Subject Matter

Example Electric Vehicle System

Figure 10:
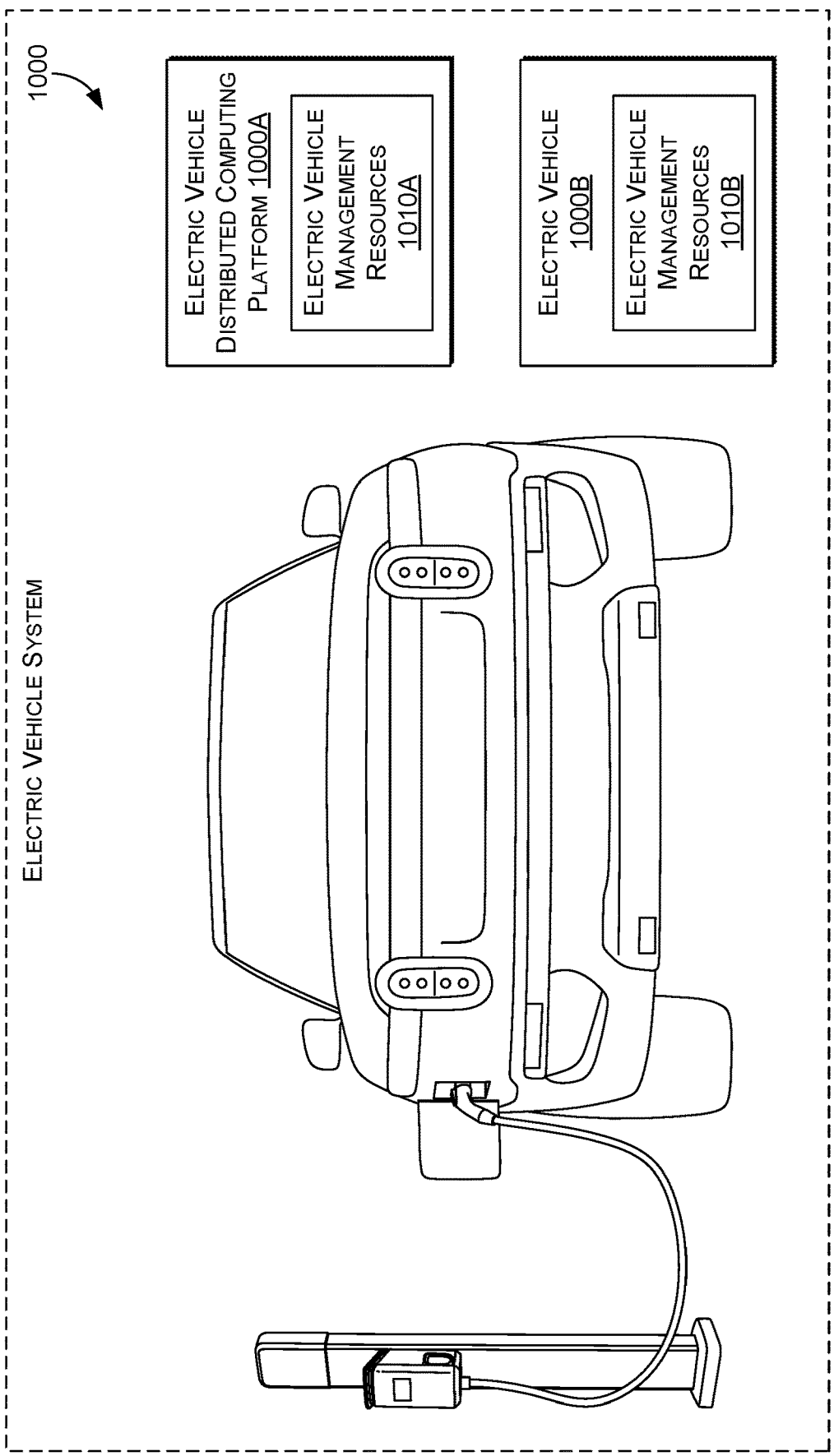
FIG. 10 is a schematic diagram of an example electric vehicle system, in accordance with aspects of the technology described herein.

With reference to FIG. 10, FIG. 10 illustrates an example EV system 1000 in which implementations of the present disclosure may be employed. In particular, FIG. 10 shows a high level architecture of an example electric vehicle distributed computing platform 1000A and electric vehicle 1000B having electric vehicle management resources 1010A and electric vehicle management resources 1010B, respectively, that support the functionality described herein. The electric vehicle system 1000 can host a technical solution environment, or a portion thereof.

The electric vehicle distributed computing platform 1000A includes electric vehicle management resources 1010A that provide and support electric vehicle distributed computing systems and operations. Electric vehicle distributed computing platform 1000A can run cloud services across different data centers and geographic regions. Typically, the electric vehicle distributed computing platform 1000A acts to store data or run service applications in a distributed manner. For example, a service application can be supported by a computing environment (e.g., host, node, and virtual machine) and resources (e.g., hardware resources and software resources) that can configure the service application; and a client device may be linked to a service application and configured to issue commands to the service application. Communications in the electric vehicle distributed computing platform 1000A are performed through a virtual Internet Protocol (IP) and over a network (not shown), which may include, without limitation, one or more local area networks (LANs) and/or wide area networks (WANs).

The electric vehicle 1000B includes electric vehicle management resources 1010B that provide and support electric vehicle systems and operations. Electric vehicle 1000B can refer to a vehicle that uses electric power. The electric vehicle 1000B can be built on a configuration for an automotive chassis used for automotive platforms of battery electric vehicles. The configuration can include a base structure that houses the batteries, electric motors, and other electronic components of the electric vehicle, such as those described herein. By way of example, the electric vehicle can include a steering system, brake sensor system, an EMM 130 (FIG. 1) and controller systems.

Controllers can include one or more systems on chips (SoCs) that may provide signals to one or more components and systems of the vehicle. For example, controllers can support a steering system, braking system, one or more onboard computing devices, artificial intelligence functionality (e.g., computer vision), infotainment functionality, global navigation satellite systems and sensors (e.g., Global Positioning System sensors, RADAR sensors, LIDAR sensors) and inertial measurement unit (IMU) sensors (e.g., accelerometers, gyroscopes). Controllers may receive inputs (e.g., represented by input data) from and provide outputs (e.g., represented by output data, display data, etc.) via a human-machine interface (HMI) display and other components of the electric vehicle.

The electric vehicle further includes a network interface which may use one or more wireless antenna(s) and/or modem(s) to communicate over one or more networks. For example, the network interface may be capable of communication over LTE, WCDMA, UMTS, GSM, CDMA2000, etc. The wireless antenna(s) may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown. The various blocks are shown with lines for the sake of conceptual clarity, and other arrangements of the described components and/or component functionality are also contemplated. FIG. 10 is merely meant to be illustrative of an example electric vehicle and electric vehicle system that can be used in connection with one or more embodiments of the present disclosure.

Example Computing Environment

Having briefly described an overview of embodiments of the present disclosure, an example operating environment in which embodiments of the present disclosure may be implemented is described below in order to provide a general context for various aspects of the present disclosure. Aspects of the disclosed embodiments may be practiced in a variety of system configurations, including hand-held devices, consumer electronics, general-purpose computers, more specialty computing devices, etc. Aspects of the disclosed embodiments may also be practiced in distributed computing environments where tasks are performed by remote-processing devices that are linked through a communications network.

Figure 11:
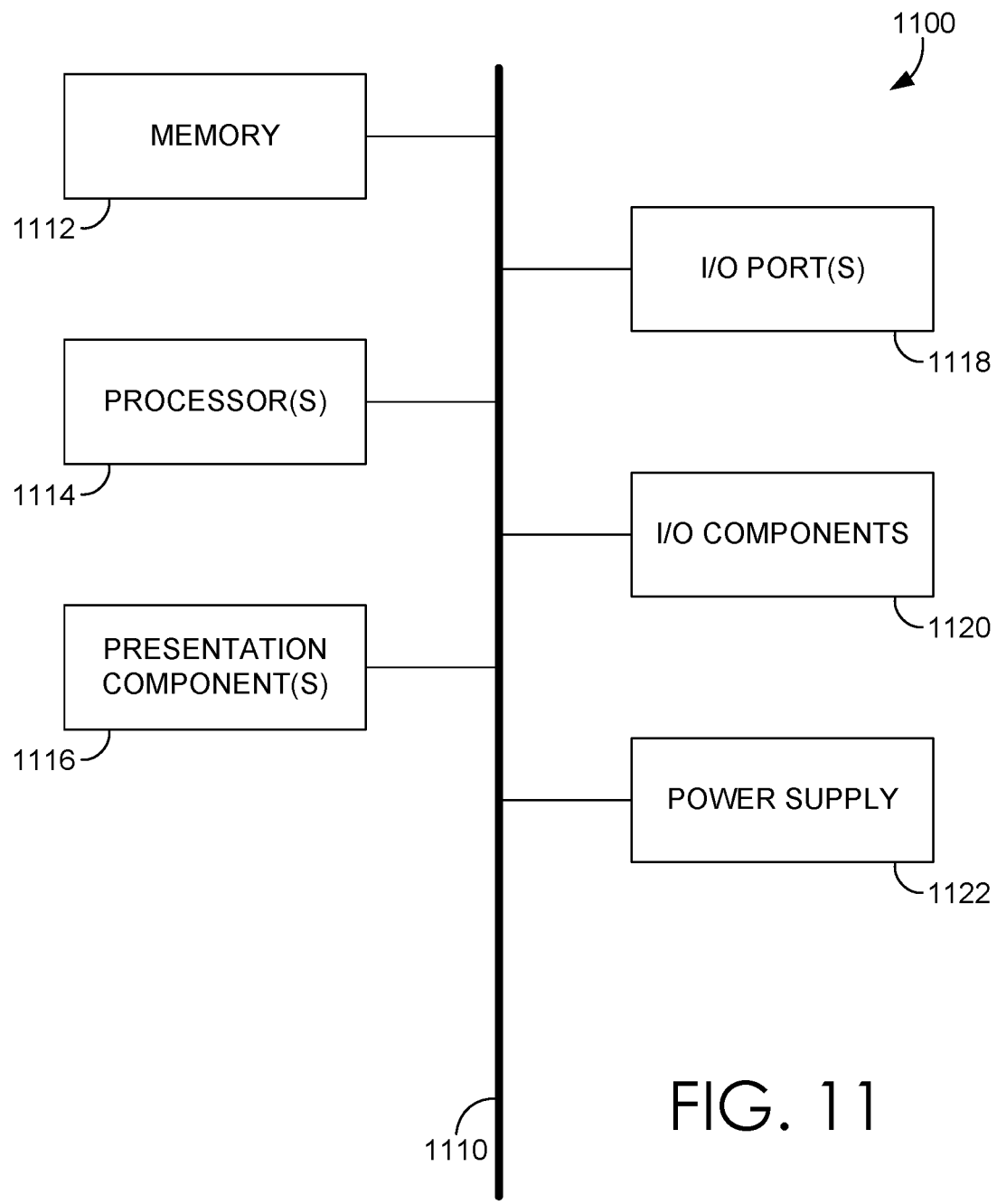
FIG. 11 is a block diagram of an exemplary computing environment suitable for use in implementing aspects of the technology described herein.

With reference to FIG. 11, computing device 1100 (which may be a part of the EMM assembly 150) includes bus 1110 that directly or indirectly couples the following devices: memory 1112, one or more processors 1114, one or more presentation components 1116, input/output ports 1118, input/output components 1120, and illustrative power supply 1122. The computing device 1100 may correspond to the controller 190 of the EV 110 of FIG. 1. Bus 1110 represents what may be one or more buses (such as an address bus, data bus, or combination thereof). The various blocks of FIG. 11 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 11 is merely illustrative of an example computing device that can be used in connection with one or more embodiments of the present disclosure. Distinction is not made between such categories as "workstation," "controller," "server," "laptop," "handheld device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may include computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors 1114 that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving" or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A system, comprising:
an energy management module (EMM) configured to be coupled to a chassis of a vehicle and a pair of suspension towers of the vehicle, wherein the EMM comprises an enclosure configured to at least partially enclose an EMM assembly of the vehicle, wherein:
the enclosure comprises a lid positioned on a housing, the lid being coupled to the pair of suspension towers,
the enclosure is configured to provide structural support between the chassis and the pair of suspension towers,
the lid comprises a tower-mounting hole configured to receive a fastener to couple the lid to a suspension tower of the pair of suspension towers,
the housing comprises a chassis-mounting hole configured to receive a fastener to couple the housing to the chassis, and
the tower-mounting hole is positioned at a higher elevation than the chassis-mounting hole.

2. The system of claim 1, wherein the enclosure is divided by a divider into a top portion and a bottom portion enclosing respective components of the EMM assembly.

3. The system of claim 1, wherein the lid of the EMM is a top lid and is coupled to the pair of suspension towers.

4. The system of claim 1, wherein the EMM assembly comprises at least one of:
an alternating current to direct current converter, a direct current to direct current converter, an auxiliary direct current to alternating current converter, a printed circuit board (PCB), a connector, a power conversion switch, or an electronics cooling system.

5. The system of claim 1, wherein the pair of suspension towers correspond to two front tires of the vehicle.

6. The system of claim 1, wherein the lid comprises load transferring ridges configured to transfer a force associated with vehicle movement to the pair of suspension towers.

7. The system of claim 1, wherein the lid comprises a plurality of truss members extending upward from the lid and arranged collinearly along a top surface of the lid.

8. The system of claim 1, wherein the housing comprises a plurality of cord openings that receive a plurality of cords to couple at least one component of the EMM assembly to a component external to the EMM.

9. A vehicle, comprising:
a chassis;
at least two suspension towers; and
an energy management module (EMM) positioned between the chassis and the at least two suspension towers, the EMM comprising an enclosure housing an EMM assembly, the enclosure comprising:
a housing coupled to the chassis; and
a lid positioned on top of the housing and coupled to the at least two suspension towers, wherein:
the enclosure is configured to provide structural support between the chassis and the at least two suspension towers,
the lid comprises a tower-mounting hole configured to receive a fastener to couple the lid to a suspension tower of the at least two suspension towers,
the housing comprises a chassis-mounting hole configured to receive a fastener to couple the housing to the chassis, and
the tower-mounting hole is positioned at a higher elevation than the chassis-mounting hole.

10. The vehicle of claim 9, wherein the enclosure comprises a divider that divides the enclosure into a top portion and a bottom portion enclosing respective components of the EMM assembly.

11. The vehicle of claim 9, wherein the EMM assembly comprises at least one of:
an alternating current to direct current converter, a direct current to direct current converter, an auxiliary direct current to alternating current converter, a printed circuit board (PCB), a connector, a power conversion switch, or an electronics cooling system.

12. The vehicle of claim 9, comprising two front tires, wherein the at least two suspension towers correspond to the two front tires.

13. The vehicle of claim 9, wherein the lid comprises a plurality of truss members extending upward from the lid between tower-mounting points at which the lid couples to the at least two suspension towers.

14. The vehicle of claim 9, wherein the housing comprises a cord opening that receives a cord to couple at least one component of the EMM assembly to a component external to the EMM.

15. A method, comprising:
    providing an energy management module (EMM) comprising an enclosure comprising a housing and a lid into an interior space at least partially defined by a chassis of a vehicle, a pair of suspension towers of the vehicle, and a front dashboard of the vehicle;
    applying a first fastener to a chassis-mounting hole of the housing and a corresponding chassis hole on the chassis; and
    applying a second fastener to a tower-mounting hole of the lid and a corresponding tower hole on a suspension tower of the pair of suspension towers, wherein the enclosure is configured to provide structural support between the chassis and the pair of suspension towers, and the tower-mounting hole is positioned at a higher elevation than the chassis-mounting hole.

16. The method of claim 15, further comprising providing an EMM assembly into the EMM, wherein the EMM assembly comprises at least one of: an alternating current to direct current converter, a direct current to direct current converter, an auxiliary direct current to alternating current converter, a printed circuit board (PCB), a connector, a power conversion switch, or an electronics cooling system.

17. The method of claim 15, further comprising providing a cord through a cord opening on the housing to couple a component of an EMM assembly within the enclosure formed to a component external to the enclosure.

\* \* \* \* \*